(12) United States Patent
Watanabe

(10) Patent No.: US 9,090,066 B2
(45) Date of Patent: Jul. 28, 2015

(54) PROCESS FOR PRODUCING INK JET RECORDING HEAD

(75) Inventor: Masahisa Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 13/460,934

(22) Filed: May 1, 2012

(65) Prior Publication Data
US 2012/0291281 A1     Nov. 22, 2012

(30) Foreign Application Priority Data

May 20, 2011 (JP) .................................. 2011-113723

(51) Int. Cl.
*B41J 2/16*     (2006.01)
*B32B 17/06*     (2006.01)

(52) U.S. Cl.
CPC .............. *B41J 2/1603* (2013.01); *B41J 2/1628* (2013.01); *B41J 2/1629* (2013.01); *B41J 2/1631* (2013.01); *B41J 2/1639* (2013.01); *B32B 17/06* (2013.01); *Y10T 29/49401* (2015.01)

(58) Field of Classification Search
CPC ...... B41J 2/1603; B41J 2/1628; B41J 2/1629; B41J 2/1631; B41J 2/1639; B32B 17/06; Y10T 29/49401
USPC .......... 29/890.1, 25.35, 611, 830; 347/44, 45, 347/47, 54, 61, 65, 68, 70; 430/313, 319
See application file for complete search history.

(56) References Cited

U.S. PATENT DOCUMENTS

| | | | |
|---|---|---|---|
| 6,591,500 | B1 | 7/2003 | Suzuki et al. |
| 6,752,489 | B2 | 6/2004 | Ohashi et al. |
| 7,241,664 | B2 | 7/2007 | Kobayashi |
| 7,300,596 | B2 | 11/2007 | Murayama et al. |
| 8,152,276 | B2 | 4/2012 | Murayama et al. |

(Continued)

FOREIGN PATENT DOCUMENTS

| | | | |
|---|---|---|---|
| JP | 05338186 A | * 12/1993 | .................. 29/890.1 |
| JP | 2002-166553 A | 6/2002 | |

(Continued)

OTHER PUBLICATIONS

Machine Language Translation of Japanese Patent Publication JP 2007-90821, English, Dec. 2014.*
Office Action issued in Japanese Patent Application No. 2011-113723, dated Jan. 27, 2015.

*Primary Examiner* — A. Dexter Tugbang
(74) *Attorney, Agent, or Firm* — Fitzpatrick, Cella, Harper & Scinto

(57) ABSTRACT

An ink jet recording head is produced to include a substrate having a first and a second surface opposing each other, a common liquid chamber formed by machining the substrate from the second surface so as to reduce the thickness of a part of the substrate, and a plurality of independent ink supply ports that communicate with the common liquid chamber and are through-holes extending through the substrate, and a nozzle structure that is formed on the first surface and has an ink flow path communicating with the independent ink supply ports and an ink ejection orifice communicating with the ink flow path. The process includes patterning a resist applied to the substrate using a photomask for forming the independent ink supply ports, wherein infrared alignment is conducted at a depression of the substrate upon alignment between the photomask and the substrate using an alignment mark.

1 Claim, 5 Drawing Sheets

(56) References Cited

U.S. PATENT DOCUMENTS

| | | | |
|---|---|---|---|
| 8,241,540 B2 | 8/2012 | Watanabe et al. | |
| 2006/0082616 A1* | 4/2006 | Hara | 347/68 |
| 2008/0165225 A1* | 7/2008 | Kitahara et al. | 347/54 |
| 2009/0095708 A1 | 4/2009 | Kubota et al. | |
| 2011/0050828 A1 | 3/2011 | Fujii et al. | |

FOREIGN PATENT DOCUMENTS

| | | |
|---|---|---|
| JP | 2005-109122 A | 4/2005 |
| JP | 2006-130766 A | 5/2006 |

* cited by examiner

PROCESS FOR PRODUCING INK JET RECORDING HEAD

BACKGROUND OF THE INVENTION

1. Field of the Invention

The present invention relates to a process for producing an ink jet recording head.

2. Description of the Related Art

U.S. Patent Publication No. 2009/0095708 discloses a production process of an ink jet recording head. In U.S. Patent Publication No. 2009/0095708, a nozzle structure having a liquid flow path is formed on a front surface (first surface) of a substrate, and a film which will become a mask material for forming a common liquid chamber (ink supply port) for supplying an ink is then formed on a back surface (second surface) of the substrate. After this film is then used to form the common liquid chamber, an ink supply port (independent ink supply port) is independently formed within the common liquid chamber by photolithography.

The etching mask on an etching start surface of the back surface of the substrate is formed by photolithography using a photomask, and alignment between the substrate and the photomask is controlled in the following manner. That is, an image of a substrate side alignment mark photographed from the upper surface side (front surface) of the substrate is superimposed on an image of an alignment mark of the photomask photographed from the lower surface side (back surface) of the substrate by image processing. The position of the photomask is then controlled in such a manner that their alignment marks are aligned with each other.

Japanese Patent Application Laid-Open No. 2005-109122 discloses a process for forming on a substrate an alignment mark used in alignment between the substrate on which a plurality of devices are formed and a photomask for masking a resist applied to the substrate. More specifically, it is disclosed that the alignment mark formed on the substrate is formed in a region to be removed from the substrate in a subsequent step in the portion of the substrate on which the devices are formed, i.e., in a region where an electronic circuit is not formed.

However, when the nozzle structure on the front surface (first surface) of the substrate is coated with a protective film for protecting the circuit upon forming a pattern of the independent supply port on the resist, and alignment between the substrate and the photomask is conducted through the nozzle structure and the protective film from the front surface side of the substrate, alignment accuracy may be lowered in some cases by the influence of the film because the alignment is conducted through the nozzle structure and the transparent protective film.

An object of the present invention is as follows. That is, the object is to provide a process for producing an ink jet recording head, by which alignment can be conducted with high accuracy without being affected by a nozzle structure and a film such as a protective film which are formed on a front surface of a substrate and without adding any step while retaining appropriate strength.

SUMMARY OF THE INVENTION

According to the present invention, there is provided a process for producing an ink jet recording head which comprises; a substrate having a first surface and a second surface which oppose to each other, a common liquid chamber formed by machining the substrate from the second surface so as to reduce the thickness of a part of the substrate and a plurality of independent ink supply ports that communicate with the common liquid chamber and are through-holes extending through the substrate, and a nozzle structure that is formed on the first surface and has an ink flow path communicating with the plurality of independent ink supply ports and an ink ejection orifice communicating with the ink flow path, the process comprising a step of patterning a resist applied to the substrate by using a photomask for forming the plurality of the independent ink supply ports, wherein in said step, infrared alignment is conducted at a depression of the substrate upon alignment between the photomask and the substrate using an alignment mark.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An ink jet recording head produced according to the present invention contains a substrate (ink jet recording head substrate) having a common liquid chamber and a plurality of independent ink supply ports and a nozzle structure having an ink flow path and an ink ejection orifice.

Incidentally, even if a protective film for protecting a circuit is provided on the nozzle structure on the front surface of the structure, high alignment accuracy can be achieved without being affected by the nozzle structure or by transparency or material of the protective film according to the present invention. In addition, the alignment can be conducted with high accuracy without causing a problem of strength because only a part of the substrate is thinned and without adding steps such as mirror polishing on the back surface of the substrate or mounting of a support substrate.

Figure 1:
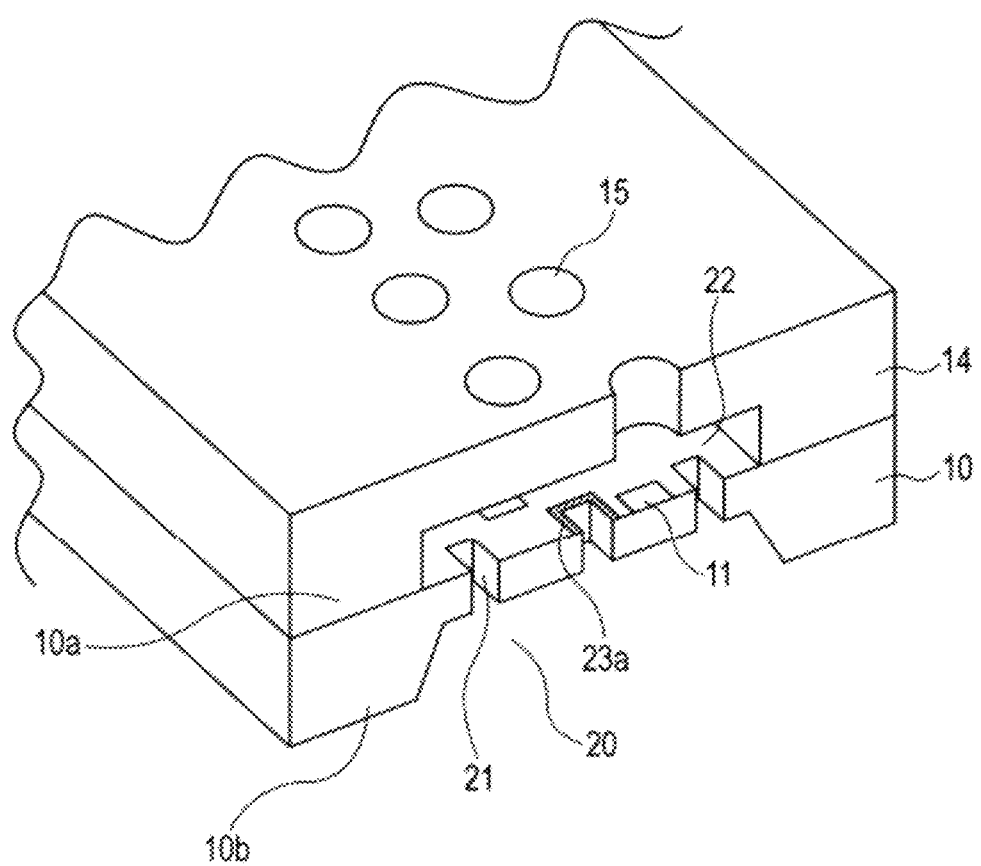
FIG. 1 is a sectional perspective view of an exemplary ink jet recording head obtained by the production process according to the present invention.

Embodiments of the present invention are described with reference to the drawings. FIG. 1 is a sectional perspective view of an exemplary ink jet recording head produced according to the present invention, illustrating such a state that it has been cut perpendicularly to the substrate.

This ink jet recording head has a silicon substrate 10 in which ink ejection energy generating elements have been formed in series at a predetermined pitch. The silicon substrate 10 has a first surface (front surface) 10a and a second surface (back surface) 10b which oppose to each other. In addition, the substrate 10 has a common liquid chamber 20 formed by machining the substrate from the second surface 10b so as to reduce the thickness of a part of the substrate and a plurality of independent ink supply ports 21 which communicate with the common liquid chamber 20 and are through-holes extending through the substrate 10.

Further, a nozzle structure 14 composed of a photosensitive resin is formed on the first surface of the substrate 10. Incidentally, the nozzle structure 14 may be formed directly on the first surface 10a, or another layer (for example, an adhesion-improving layer) may be formed between the nozzle structure 14 and the first surface 10a. The nozzle structure 14 has an ink ejection orifice 15 opened above each of the ink ejection energy generating elements 11 in the drawing and further has an ink flow path 22 communicating with each of the ink ejection orifices 15 and each of the independent ink supply ports 21.

Incidentally, the common liquid chamber 20 opened in the second surface 10b can be formed by, for example, anisotropic etching against the silicon. In addition, the independent ink supply ports 21 can be formed by causing an alignment mark to transmit with an infrared ray from the side of the back surface (second surface) to conduct alignment between a photomask and the substrate and then dry-etching the substrate 10 with the photomask. FIG. 1 illustrates a trace 23a of the substrate side alignment mark used in the alignment between the substrate and the photomask.

This ink jet recording head can eject an ink droplet from the ink ejection orifice 15 by applying a pressure generated by the energy generating element 11 to an ink (liquid) filled into the ink flow path 22 through the independent ink supply port 21. This ink droplet ejected is applied to a recording medium, whereby recording can be conducted.

The present invention has a step of patterning a resist (a resist layer 18 which will be described subsequently) applied to the substrate by using a photomask for forming the plurality of independent ink supply ports. In this step, alignment between the photomask and the substrate is conducted by using a substrate side alignment mark and a photomask side alignment mark. Upon this alignment, infrared alignment which will be described subsequently is conducted at a depression of the substrate 10.

Incidentally, the depression of the substrate 10 at which the infrared alignment is conducted may be either the common liquid chamber 20 or another depression formed in the second surface 10b.

Incidentally, the photomask has a pattern form corresponding to the plurality of independent ink supply ports formed in the substrate. In the present invention, this pattern form corresponding to the independent ink supply ports may be used as the photomask side alignment mark as it is. For example, when a positive resist is used in a resist layer 18, at least one of the openings of the photomask corresponding to the plurality of independent ink supply ports may be used as the photomask side alignment mark as it is. When a negative resist is used in the resist layer 18 on the other hand, at least one of the shade portions of the photomask corresponding to the plurality of independent ink supply ports may be used as the photomask side alignment mark as it is. That is, the photomask side alignment mark may fulfill a role of forming an independent supply port pattern on the resist (resist layer 18) in addition to a role as the mark used upon the alignment.

An exemplary process for producing an ink jet recording head according to the present invention will now be described with reference to FIGS. 2A to 2I.

Figure 2A:
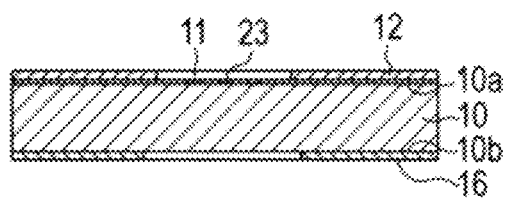
FIGS. 2A, 2B, 2C, 2D, 2E, 2F, 2G, 2H and 2I illustrate a process for producing an ink jet recording head which is shown in Example 1.

First, a substrate 10 illustrated in FIG. 2A and provided with an ink ejection energy generating element 11 and an alignment mark 23 is prepared. As the substrate, for example, a silicon substrate may be used. Incidentally, examples of a material for forming the substrate side alignment mark 23 include Al and SiO.

This substrate 10 has an adhesion-improving layer 12 in which a pattern of an ink flow path 22 has been formed by a photolithographic process on a front surface 10a and has a mask material 16 in which a pattern used in the formation of a common liquid chamber 20 has been formed and a thermal oxide film layer (not illustrated) on a back surface 10b. For example, a polyamide resin may be used as the adhesion-improving layer 12. As the mask material 16, for example, a polyamide resin may be used.

Figure 2B:
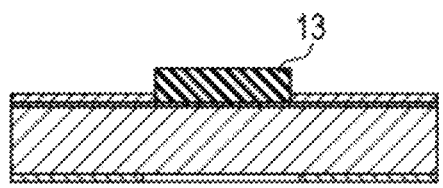

A positive resist layer 13 is then formed on the pattern of the adhesion-improving layer 12 of this substrate 10 as illustrated in FIG. 2B. Incidentally, as the positive resist layer 13, for example, an acrylic resin may be used.

A liquid flow path structure material is then applied so as to cover the positive resist layer 13 to form a liquid flow path structure material layer. As the liquid flow path structure material to be applied, for example, a photosensitive material containing an epoxy resin as a main component may be used. An ink ejection orifice 15 is then formed in this liquid flow path structure material layer to form a nozzle structure 14 in which an ink flow path is filled with the positive resist layer 13. Specifically, the liquid flow path structure material layer is subjected to exposure and development by using a photomask (not illustrated) to form the ejection orifice 15. Incidentally, structure material having negative properties is generally used in the liquid flow path structure material layer, so that a photomask which does not expose a portion to be an ejection orifice to light is used.

Figure 2C:
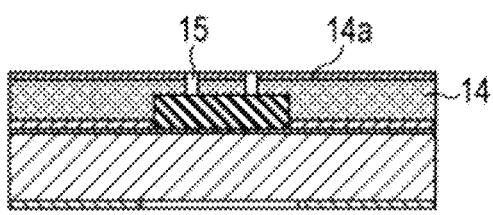

Incidentally, a water repellent material layer may also be formed on the liquid flow path structure material layer. When the water repellent material layer is formed, the liquid flow path structure material layer and the water repellent material layer may be subjected to exposure and development at the same time to form the ejection orifice 15, thereby forming the nozzle structure 14 and a water repellent film 14a as illustrated in FIG. 2C. A solvent such as xylene is favorably used for the development.

Figure 2D:
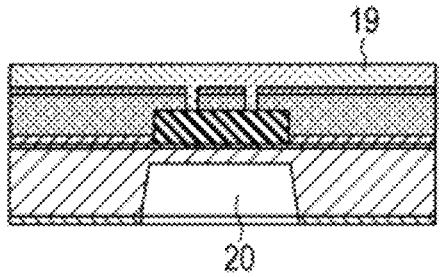

As illustrated in FIG. 2D, a protective film 19 is applied on to the nozzle structure 14 (the surface of the water repellent film 14a in FIG. 2D) for protecting the nozzle structure from an alkali solution. As a material for this protective film 19, for example, a material commercially available with a name of OBC from TOKYO OHKA KOGYO CO., LTD may be used.

Thereafter, this silicon substrate is immersed in, for example, tetramethylammonium hydride (TMAH) to form a common liquid chamber 20 for ink supply. At this time, the amount of the silicon left, i.e., the thickness from the first surface 10a to the bottom of the common liquid chamber, is favorably controlled to 100 μm or more and 200 μm or less from the viewpoint of the recognition of the alignment mark.

Figure 2E:
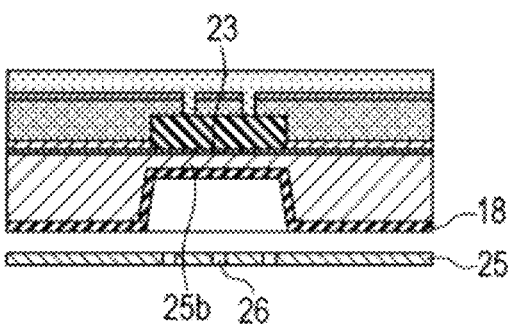

The mask material 16 and the thermal oxide film layer formed on the back surface 10b are then removed by, for example, etching. Thereafter, a resist is applied by means of, for example, a sprayer to form a resist layer (a photosensitive layer) 18 as illustrated in FIG. 2E.

Alignment between a photomask 25 and the substrate is conducted by infrared alignment using a photomask side alignment mark 26 and the substrate side alignment mark 23. Incidentally, FIG. 2E illustrates a photomask in the case where a positive resist is used for the resist layer 18. The photomask side alignment mark 26 is formed at the time the mask is formed.

The alignment (infrared alignment) between the photomask 25 and the substrate 10 using an infrared ray will now be described in detail.

The alignment marks used in the alignment are arranged at opposing positions of the substrate 10 and the photomask 25 (another layer may intervene between the mark 23 and the mark 26). Incidentally, the positions of the alignment marks (positions in horizontal directions in FIG. 2E) respectively formed on the substrate 10 and the photomask 25 may be selected as needed so far as the marks 23 and 26 can be arranged at the opposing positions to conduct the infrared alignment at the depression (common liquid chamber 20 or another depression) of the substrate.

In FIG. 2E, the alignment marks 23 and 26 are arranged at respective positions corresponding to the common liquid chamber 20. More specifically, the mark 23 is arranged above the common liquid chamber 20 in FIG. 2E, and the mark 26 below the common liquid chamber 20 in FIG. 2E. In FIG. 2E, the mark 23 is formed in a region in which an electronic circuit such as the energy generating element 11 is not formed.

Figure 5:
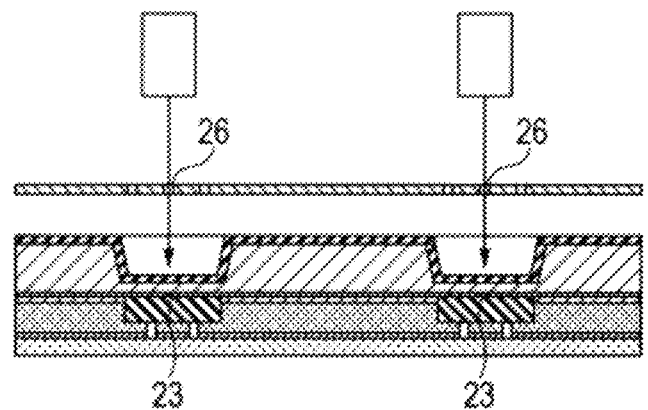
FIG. 5 illustrates infrared alignment.

When the infrared alignment is conducted, a portion of the substrate 10 with a reduced thickness (depression, or the common liquid chamber 20 in FIG. 2E) is then irradiated with an infrared ray (a wavelength: for example, 1,100 nm to 1,200 nm) to transmit the infrared ray through the substrate 10. The infrared alignment is then conducted at the depression by using the substrate side alignment mark 23 and the photomask-like alignment mark 26. The alignment is conducted from the side of the back surface (second surface), whereby the influence of any film is avoided. More specifically, the infrared ray is transmitted to the substrate side alignment mark 23 from the side of the back surface of the substrate as illustrated in FIG. 5, whereby the mark 23 is aligned with the mask-side alignment mark 26. The alignment may be conducted by irradiating the depression with the infrared ray and then aligning the center of the substrate side alignment mark with the center of the mask-side alignment mark by image processing.

Figure 3A:
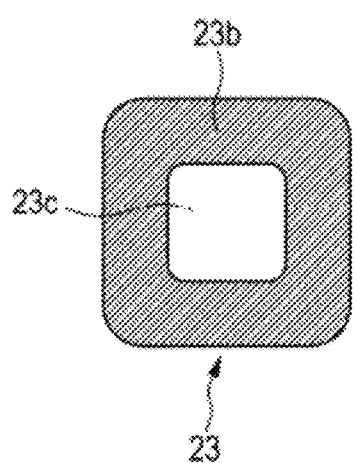
FIGS. 3A, 3B, 3C and 3D illustrate examples of alignment marks of a substrate and a photomask.
Figure 3B:
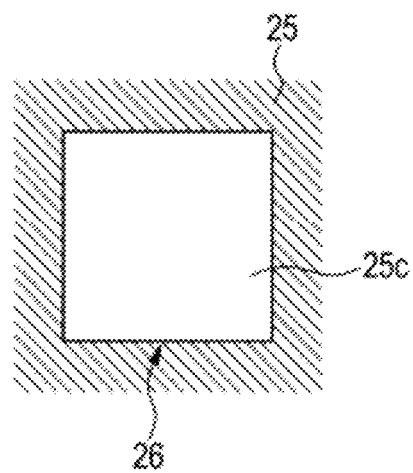
Figure 3C:
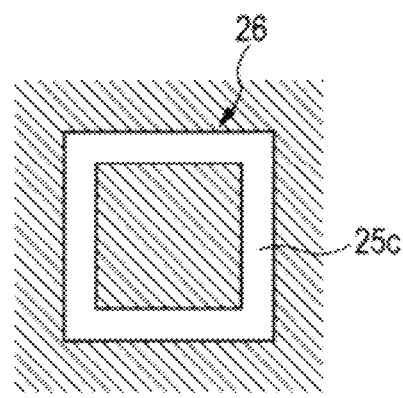
Figure 3D:
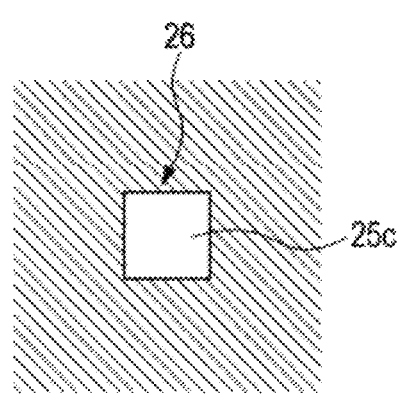

Here, an example of the alignment mark 23 formed on the substrate 10 is illustrated in FIG. 3A, and examples of the alignment mark 26 formed on the side of the photomask 25 when the positive resist is used for the resist layer 18 are illustrated in FIGS. 3B to 3D. The material forming the mark 23 may be arbitrarily selected. In, for example, FIG. 3A, a portion 23b may be formed by Al, and a portion 23c may be formed by SiO. Alternatively, the portion 23c may also be formed as a vacant space (void).

Incidentally, the shapes of the alignment marks of the substrate and the photomask may be selected according to the kind of the resist used for the resist layer 18, conditions for patterning of the resist layer 18 which will be conducted after the infrared alignment and conditions for etching of the substrate 10.

When the substrate is etched by using the patterned resist layer 18, for example, the following mark may be used as the mark 26 in the case where a through-hole extending through the substrate 10, such as an independent ink supply port, is formed in a portion 25b of the substrate corresponding to the mark 26 as illustrated in FIG. 2E. That is, such a large mark as illustrated in FIG. 3B may be used. The size of this mark may be any size so long as the portion 25b of the substrate can also be etched (for example, dry-etched) when the substrate is etched by using the patterned resist layer 18 and the through-hole extending through the substrate 10 can be formed in this portion 25b. Incidentally, the size of an opening (cut-out portion) 25c is the size of the mark 26 in FIG. 3B. FIG. 2E. That is, such a large mark as illustrated in FIG.

Incidentally, when the independent ink supply port is formed in the portion 25b of the substrate, the size of the opening 25c of the mark 26 is favorably not smaller than an opening of the independent ink supply port. That is, the area of the mark 26 (opening area of the mark 26 in FIG. 3B) is favorably not smaller than the opening area of the independent ink supply port formed.

Figure 4:
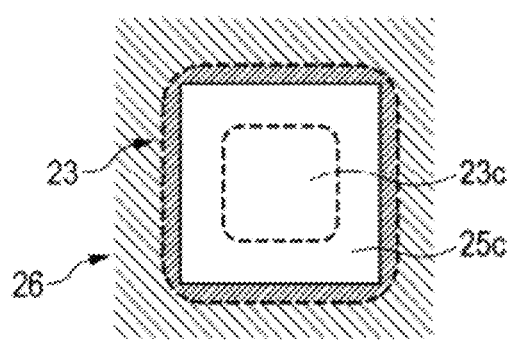
FIG. 4 illustrates a state viewed from the side of a photomask when a resist pattern is formed on a back surface of a substrate.

When the mark illustrated in FIG. 3A is used as the substrate side mark 23, and the mark illustrated in FIG. 3B is used as the photomask side mark 26 upon the infrared alignment, the respective alignment marks when the substrate 10 is viewed from the side of the photomask 25 are illustrated in FIG. 4. In FIG. 4, an inner-side portion 23c of the mark 23 is arranged within the square of the cut-out portion 25c of the mark 26.

Figure 6A:
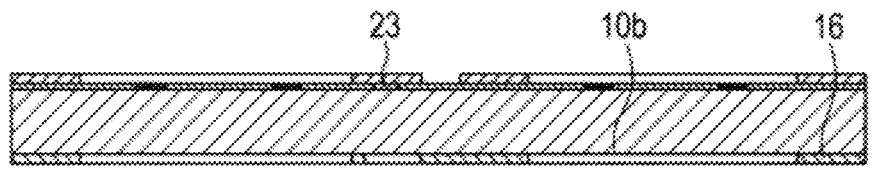
FIGS. 6A, 6B and 6C illustrate a process for producing an ink jet recording head which is shown in Example 2.
Figure 6B:
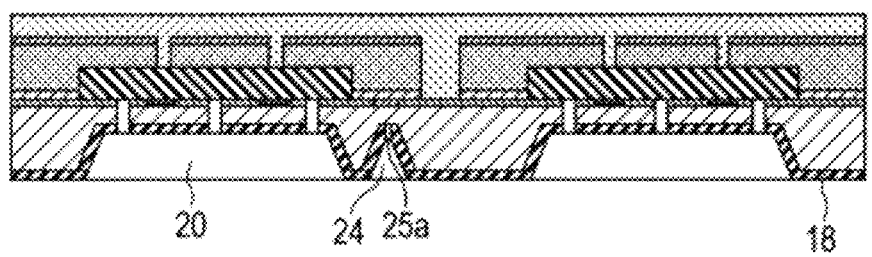
Figure 6C:
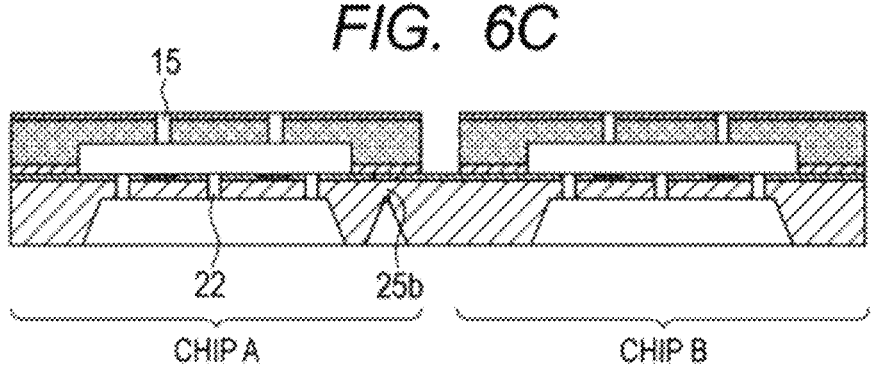

FIGS. 6A to 6C and FIGS. 7A to 7C respectively illustrate examples where a through-hole extending through the substrate is formed in the portion 25b of the substrate when the substrate is etched by using the patterned resist layer 18. FIGS. 6A, 6B and 6C as well as FIGS. 7A, 7B and 7C correspond to FIGS. 2A, 2H and 2I, respectively.

When an ink jet recording head is produced, a plurality of ink jet recording heads (chips) are generally produced in one wafer (substrate) at the same time. Two chips (Chips A and B) among the plurality of the chips are illustrated in FIGS. 6A to 6C and FIGS. 7A to 7C.

In the case where no through-hole extending through the substrate is formed in the portion 25b of the substrate corresponding to the mark of the photomask when the substrate is etched by using the patterned resist layer 18 as illustrated in FIGS. 6A to 6C and FIGS. 7A to 7C, for example, the following mark may be used as the mark 26. That is, such a fine or small mark as illustrated in FIG. 3C or 3D may be used. The size of this mark may be any size so long as when the substrate is subjected to etching by using the patterned resist layer 18, the portion 25b of the substrate is not etched or the through-hole extending through the substrate 10 is not formed in this portion 25b even when etched. Incidentally, the size of an opening (cut-out portion) 25c is the size of the mark 26 in FIGS. 3C and 3D.

When the substrate is viewed from the side of the photomask 25 as illustrated in FIG. 4 when the mark illustrated in FIG. 3A and the mark illustrated in FIG. 3D are respectively used as the mark 23 and the mark 26 upon the infrared alignment, the cut-out portion 25c can be arranged within the portion 23c.

Incidentally, when the pattern of the mark 26 of the photomask exceeds a resolution limit of the resist layer 18 used, a pattern corresponding to the mark 26 is not formed in the resist layer 18 upon patterning using the photomask. When a fine or small mark 26 is used even if the pattern does not reach the resolution limit, an etchant gas is hard to enter the portion 25b of the substrate corresponding to the mark 26 upon the etching using the patterned resist layer 18. Therefore, even if a part of the portion 25b of the substrate is etched with an etchant gas passing through an opening 25a upon the etching using the resist layer 18, alignment between the substrate and the photomask can be performed without forming the through-hole extending through the substrate in the portion 25b of the substrate as illustrated in FIGS. 6B and 6C or FIGS. 7B and 7C.

Incidentally, in this case, the shape (for example, a square in FIG. 3D) of the photomask side alignment mark may be made smaller than the opening shape (for example, a circle or rectangle) of the opening 25a.

In FIGS. 6A to 6C, the alignment mark 23 is formed in a region finally left in the resulting ink jet recording head without being removed. Alternatively, in FIGS. 7A to 7C, the alignment mark 23 is formed in a region finally cut out (scribe line). Incidentally, in the present invention, the alignment mark 23 may also be formed in a region (for example, a region which will become an independent ink supply port 21) removed from the substrate in a step subsequent to the patterning step of the resist layer 18.

Figure 2F:
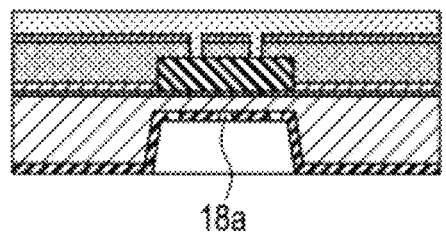

In FIGS. 2A to 2I, the resist layer 18 is exposed and developed by using the photomask 25 having the mark 26 (for example, the mark illustrated in FIG. 3B) used in the alignment after the infrared alignment to form a pattern 18a of an independent supply port as illustrated in FIG. 2F.

Figure 2G:
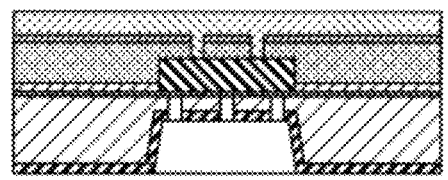
Figure 2H:
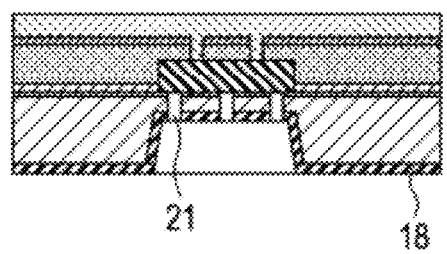

A plurality of through-holes extending through the substrate are then formed by a dry etching process using the pattern of the resist layer 18 as a mask as illustrated in FIG. 2G. Then, the etching is further conducted to communicate these plural through-holes with a portion which will become an ink flow path (a positive resist layer 13) as illustrated in FIG. 2H, thereby forming a plurality of independent supply ports 21. Incidentally, as an exposure unit used in the patterning of the resist layer 18, an exposure unit of a proximity system may also be used without causing a problem in addition to an exposure unit of a projection system so long as desired patterning can be conducted.

Figure 2I:
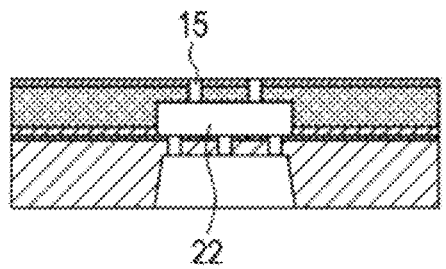

Finally, this silicon substrate is immersed in a protective film removing liquid to remove the protective film 19 as illustrated in FIG. 2I. Incidentally, as the protective film removing liquid, for example, xylene may be used. Thereafter, the positive resist layer 13 that is a form material for the ink flow path 22 (liquid flow path) is decomposed by the whole surface exposure and then removed with a solvent. Incidentally, for example, methyl lactate may be used as this solvent. An ink jet recording head having an ejection orifice 15 and an ink flow path 22 communicating with the ejection orifice 15 is thereby formed.

Example 1

An ink jet recording head was produced according to a process flow illustrated in FIGS. 2A to 2I. Detailed description will hereinafter be given.

A substrate 10 provided with an ink ejection energy generating element 11 and an alignment mark 23 and illustrated in FIG. 2A was first prepared. Incidentally, in Example 1, that obtained by subjecting an Al pattern to cutting-out and illustrated in FIG. 3A was used as the alignment mark 23, and this mark 23 was arranged at a position above a portion where a common liquid chamber 20 is formed in FIG. 2A. This substrate 10 had an adhesion-improving layer 12 in which a pattern of an ink flow path had been formed by a photolithographic process on a front surface 10a. This adhesion-improving layer 12 is formed of a polyamide resin. The substrate 10 also had a mask material 16 in which a pattern to be used in the formation of the common liquid chamber 20 had been formed and a thermal oxide film layer (not illustrated) on a back surface 10b. This mask material 16 is formed of a polyamide resin.

A positive resist layer 13 formed of an acrylic resin was then formed on the pattern of the adhesion-improving layer 12 on the substrate 10 by a photolithographic process as illustrated in FIG. 2B.

A liquid flow path structure material composed of a photocurable resin was then applied so as to cover the positive resist layer 13 as illustrated in FIG. 2C to form a liquid flow path structure material layer. A water repellent layer was further formed on this liquid flow path structure material layer. The liquid flow path structure material layer and the water repellent layer were then exposed and developed at the same time by using a photomask (not illustrated) to form an ejection orifice 15, thereby forming a nozzle structure 14 and a water repellent film 14a. Incidentally, xylene was used for the development.

As illustrated in FIG. 2D, a protective film 19 was then applied on to the surface of the water repellent film 14a for protecting the nozzle structure from an alkali solution. As a material for this protective film 19, a material commercially available with a name of OBC from TOKYO OHKA KOGYO CO., LTD was used. Thereafter, this silicon substrate was immersed in tetramethylammonium hydride (TMAH) to form a common liquid chamber 20 for ink supply. At this time, the thickness from the first surface 10a to the bottom of common liquid chamber was 150 μm.

As illustrated in FIG. 2E, the mask material 16 and the thermal oxide film layer formed on the back surface 10b were then removed. Thereafter, a positive resist was applied as a resist by means of a sprayer to form a resist layer 18.

A photomask 25 having a mark 26 illustrated in FIG. 3B was then used to conduct infrared alignment. At this time, the common liquid chamber (common ink supply port) 20 in the substrate 10 was irradiated with an infrared ray (1,100 nm to 1,200 nm) from the side of the back surface 10b, thereby conducting the infrared alignment by using the substrate side alignment mark 23 and a photomask-like alignment mark 26. Incidentally, in Example 1, the opening shape and size (opening area) of the photomask side alignment mark were matched with the opening shape and size of an independent ink supply port 21.

The photomask 25 was then used to expose and develop the resist layer 18, thereby forming a pattern of the independent ink supply port as illustrated in FIG. 2F.

The thus-formed pattern of the resist layer 18 was used as a mask to form an independent supply port 21 by a dry etching process as illustrated in FIGS. 2G and 2H. At this time, a through-hole extending through the substrate 10, i.e., an independent ink supply port 21, was formed even in a portion 25b of the substrate corresponding to the alignment mark 26.

Finally, this silicon substrate was immersed in xylene to remove the protective film 19 and form an ejection orifice 15 as illustrated in FIG. 2I. Thereafter, the positive resist layer 13 that is a form material for an ink flow path 22 was decomposed by the whole surface exposure and then removed with a solvent (methyl lactate) to form an ejection orifice 15 and an ink flow path 22 communicating with the independent ink supply port 21.

Example 2

In Example 2, a substrate side alignment mark 23 (mark illustrated in FIG. 3A) was arranged above another position than a position which will become an opening of a common ink supply port 20 in a second surface 10b within a chip A as illustrated in FIGS. 6A to 6C.

As illustrated in FIG. 6A, a mask material 16 having an opening even at a position located below the mark 23 in addition to the opening corresponding to the common liquid chamber 20 was used. This mask material 16 was used, whereby another depression 24 other than the common ink supply port 20 was also formed as illustrated in FIG. 6B when the common ink supply port 20 was formed in the second surface 10b of the substrate 10 according to the same process as in Example 1.

Incidentally, a mark illustrated in FIG. 3C and having an opening shape finer than an independent supply port was used as the alignment mark on the side of a photomask (not illustrated). This depression 24 was irradiated with an infrared ray from the side of a back surface 10b of the substrate to transmit the infrared ray through the substrate 10, thereby conducting alignment between the substrate and the photomask. An ink jet recording head having an ejection orifice 15 and a liquid flow path 22 communicating with the ejection orifice 15 that are illustrated in FIG. 6C was produced in the same manner as in Example 1 except for the above. In Example 2, no through-hole extending through the substrate was formed at the portion 25b of the substrate corresponding to the alignment mark 26.

Example 3

Figure 7A:
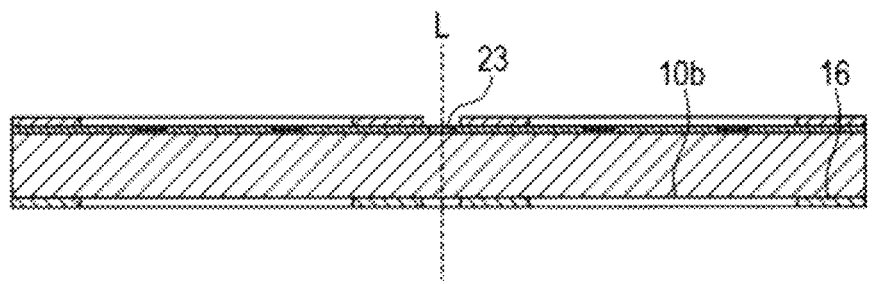
FIGS. 7A, 7B and 7C illustrate a process for producing an ink jet recording head which is shown in Example 3.

In Example 3, a substrate side alignment mark 23 (mark illustrated in FIG. 3A) was arranged on a cutting line L between chips as illustrated in FIG. 7A.

Figure 7B:
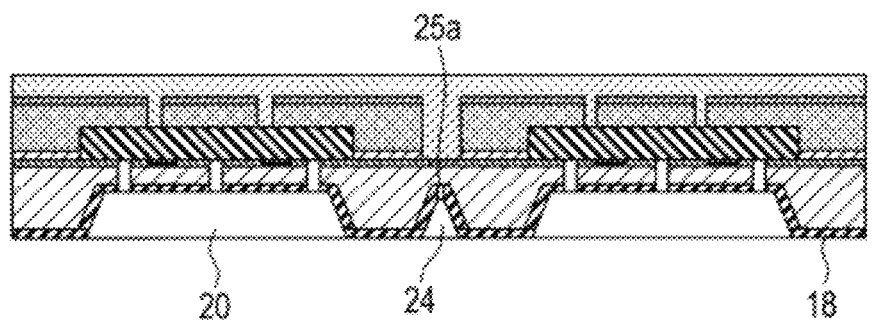

As illustrated in FIG. 7A, a mask material 16 having an opening even at a position located below the mark 23 in addition to the opening corresponding to the common liquid chamber 20 was used. This mask material 16 was used, whereby a depression 24 was also formed as illustrated in FIG. 7B when the common ink supply port 20 was formed according to the same process as in Example 1.

Figure 7C:
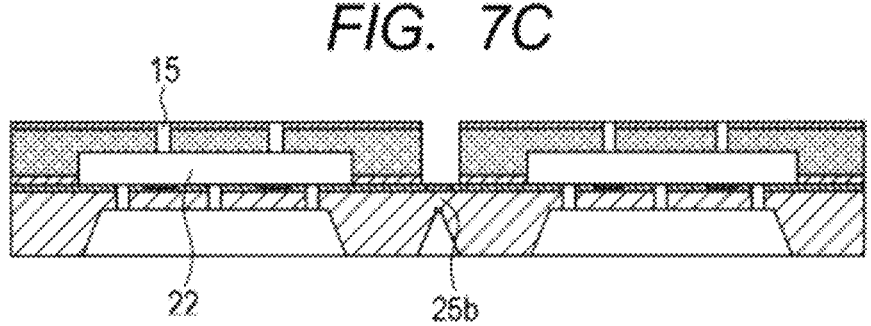

Incidentally, a mark illustrated in FIG. 3D and having an opening shape smaller than an independent supply port was used as the alignment mark on the side of a photomask (not illustrated). This depression 24 was irradiated with an infrared ray from the side of a back surface 10b of the substrate to transmit the infrared ray through the substrate, thereby conducting alignment between the substrate and the photomask. An ink jet recording head having an ejection orifice 15 and a liquid flow path 22 communicating with the ejection orifice 15 that are illustrated in FIG. 7C was produced in the same manner as in Example 1 except for the above. In Example 3, no through-hole extending through the substrate was formed at the portion 25b of the substrate corresponding to the alignment mark 26.

According to the present invention, there is provided a process for producing an ink jet recording head, by which alignment can be conducted with high accuracy without being affected by a nozzle structure and a film such as a protective film which are formed on a front surface of a substrate and adding any step while retaining appropriate strength.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-113723, filed May 20, 2011, which is hereby incorporated by reference herein in its entirety.

What is claimed is:

1. A process for producing an ink jet recording head which comprises:
   a substrate having a first surface and a second surface which oppose to each other, a common liquid chamber formed by machining the substrate from the second surface so as to reduce the thickness of a part of the substrate, and a plurality of independent ink supply ports that communicate with the common liquid chamber and are through-holes extending through the substrate; and
   a nozzle structure that is formed on the first surface and has an ink flow path communicating with the plurality of independent ink supply ports and an ink ejection orifice communicating with the ink flow path,
   the process comprising a step of patterning a resist applied to the substrate by using a photomask for forming the plurality of the independent ink supply ports,
   wherein in said step of patterning, infrared alignment is conducted at a depression of the substrate upon alignment between the photomask and the substrate using an alignment mark,
   wherein the depression at which the infrared alignment is conducted is the common liquid chamber, wherein an area of the alignment mark of the photomask used in the infrared alignment is not smaller than an opening area of one of the independent ink supply ports, and wherein one of the independent ink supply ports communicating with the ink flow path is formed at a portion of the substrate corresponding to the alignment mark of the photomask.

* * * * *